United States Patent
Saikkonen

(10) Patent No.: US 8,522,497 B2
(45) Date of Patent: Sep. 3, 2013

(54) DEVICE FOR LEADING PIPES OF A SOLAR CELL THROUGH A ROOF

(75) Inventor: Eero Saikkonen, Vaasa (FI)

(73) Assignee: SK Tuote Oy, Mustasaari (FI)

( * ) Notice: Subject to any disclaimer, the term of this patent is extended or adjusted under 35 U.S.C. 154(b) by 10 days.

(21) Appl. No.: 13/264,260

(22) PCT Filed: Apr. 12, 2010

(86) PCT No.: PCT/FI2010/050292
§ 371 (c)(1),
(2), (4) Date: Dec. 7, 2011

(87) PCT Pub. No.: WO2010/119174
PCT Pub. Date: Oct. 21, 2010

(65) Prior Publication Data
US 2012/0073221 A1 Mar. 29, 2012

(30) Foreign Application Priority Data
Apr. 15, 2009 (FI) ...................................... 20095410

(51) Int. Cl.
*E04C 2/52* (2006.01)
(52) U.S. Cl.
USPC .................. 52/220.8; 52/198; 52/219; 52/60; 285/43
(58) Field of Classification Search
USPC ............. 52/219, 199, 218, 220.8, 198, 220.1, 52/302.1, 301; 285/42, 43, 44; 136/244, 136/251
See application file for complete search history.

(56) References Cited

U.S. PATENT DOCUMENTS

| | | | | | |
|---|---|---|---|---|---|
| 1,820,995 | A | * | 9/1931 | Wehman | 174/75 D |
| 1,890,050 | A | * | 12/1932 | Fullman | 174/75 D |
| 1,991,772 | A | * | 2/1935 | Rieger et al. | 210/166 |
| 2,121,220 | A | * | 6/1938 | Filkins | 210/166 |
| 2,565,131 | A | * | 8/1951 | Johnson | 454/366 |
| 2,666,493 | A | * | 1/1954 | Gordon | 210/166 |
| 2,741,972 | A | * | 4/1956 | Pryne | 454/27 |

(Continued)

FOREIGN PATENT DOCUMENTS

| | | |
|---|---|---|
| DE | 20121406 U1 | 8/2002 |
| DE | 10115209 A1 | 10/2002 |

(Continued)

OTHER PUBLICATIONS

Finnish Search Report, dated Feb. 18, 2010, from corresponding Finnish application.

(Continued)

*Primary Examiner* — Robert Canfield
*Assistant Examiner* — Babajide Demuren
(74) *Attorney, Agent, or Firm* — Young & Thompson

(57) ABSTRACT

A device for leading pipes (6) of a solar cell through a roof, which device is characterized by a connecting sleeve having an upper end with an annular cross section, the connecting sleeve being mounted onto the straight-cut upper end of a dome-like collar (2a) of a conventional pipe duct (2) to surround the opening of the collar (2a), as well as by a cap (4) turnably installed on the upper end of the connecting sleeve (3) and provided with a sideward-facing receiving opening (5) for pipes (6) to be led from a solar cell into the building, whereby the receiving opening (5) is sealable around the pipes (6).

5 Claims, 3 Drawing Sheets

(56) References Cited

U.S. PATENT DOCUMENTS

| | | | | |
|---|---|---|---|---|
| 2,878,743 | A | * | 3/1959 | Trunnell ............ 454/366 |
| 2,895,752 | A | * | 7/1959 | De Barrie ............ 343/713 |
| 3,521,414 | A | * | 7/1970 | Malissa ............ 52/107 |
| 3,593,478 | A | * | 7/1971 | Mason ............ 52/252 |
| 3,873,136 | A | * | 3/1975 | Curry ............ 285/189 |
| 4,102,090 | A | * | 7/1978 | Anguish ............ 52/58 |
| 4,480,534 | A | * | 11/1984 | Sloan ............ 454/182 |
| 5,129,387 | A | * | 7/1992 | Behrens ............ 126/570 |
| 5,662,522 | A | * | 9/1997 | Waltz ............ 454/359 |
| 6,102,794 | A | * | 8/2000 | Cline ............ 454/368 |
| 6,219,977 | B1 | * | 4/2001 | Chao et al. ............ 52/200 |
| 8,209,923 | B1 | * | 7/2012 | Rich ............ 52/219 |
| 8,307,590 | B2 | * | 11/2012 | Smith ............ 52/198 |
| 2003/0079424 | A1 | | 5/2003 | Menzies |
| 2005/0022859 | A1 | * | 2/2005 | Nass et al. ............ 136/251 |
| 2007/0261327 | A1 | * | 11/2007 | Gilleran ............ 52/220.1 |

FOREIGN PATENT DOCUMENTS

| | | | |
|---|---|---|---|
| JP | 8135851 | A | 5/1996 |
| JP | 2008266977 | A | 11/2008 |
| WO | 2007099205 | A1 | 9/2007 |

OTHER PUBLICATIONS

International Search Report, dated Jul. 19, 2010, from corresponding PCT application.

* cited by examiner

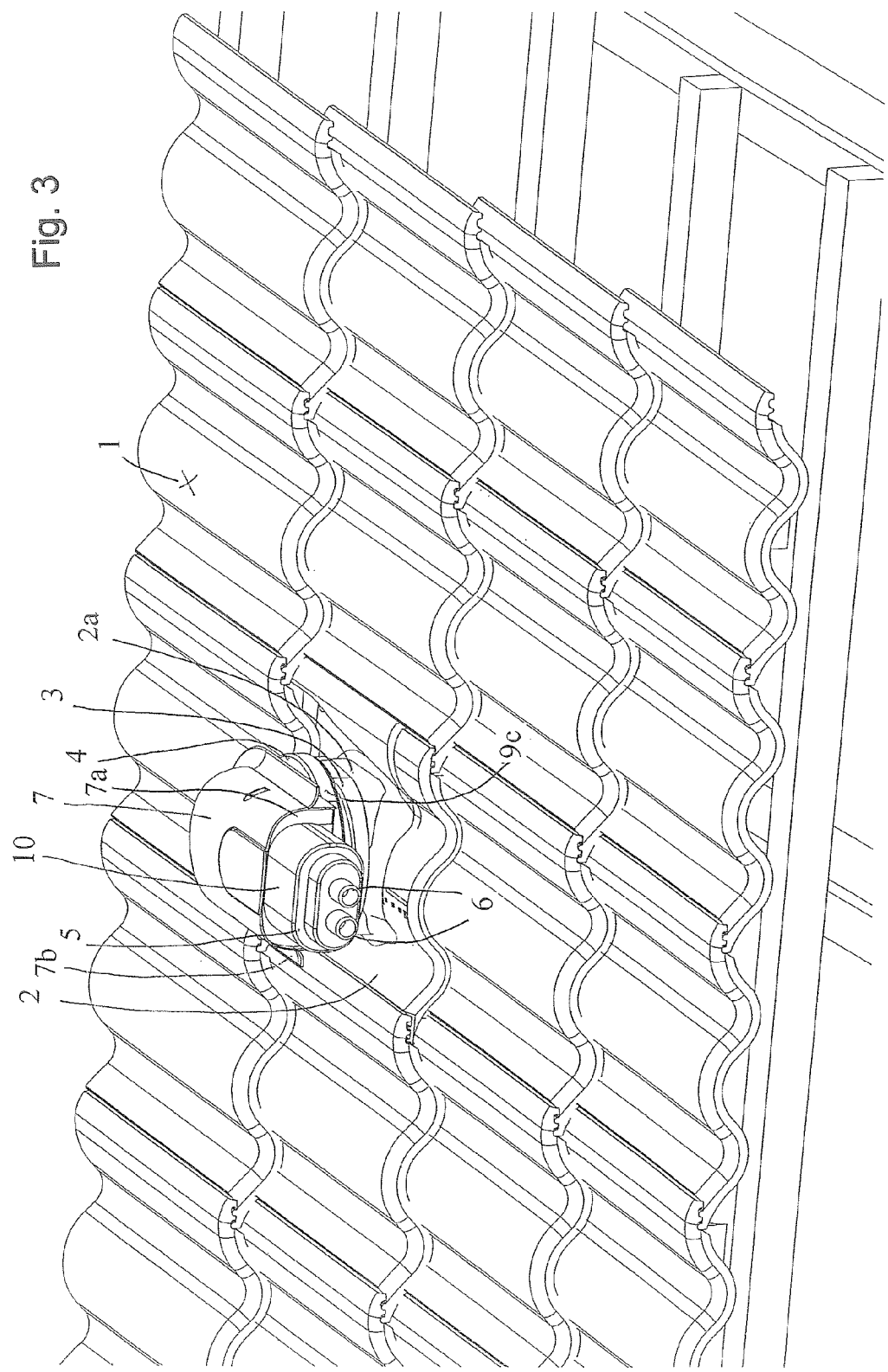

DEVICE FOR LEADING PIPES OF A SOLAR CELL THROUGH A ROOF

This invention relates to a device for leading pipes of a solar cell through a roof.

No practicable solution for reliably leading pipes of a solar cell through a roofing material is available on the market.

The object of the present invention is to eliminate this problem. This can be achieved by a device, which is characterized by a connecting sleeve having an upper end with an annular cross-section, said connecting sleeve being mounted onto a straight-cut upper end of a dome-like collar of a conventional pipe duct to surround the opening of the collar, as well as a cap turnably installed on the upper end of said connecting sleeve and provided with a sideward-facing receiving opening for the pipes to be lead from a solar cell into the building, which receiving opening is sealable around said pipes.

The cap of the device is provided with a dome-like detachable cover being open towards the receiving opening. Preferably, this detachable cover is attachable to the lower part of the cap by means of screws enabling access to an aeration screw provided for the pipes of a solar cell under said cover, when said pipes need to be aerated.

The turnably mounted cap comprises a lower part, which in its lower end is formed to a cylindrical part extending into the connecting sleeve, and in its upper end to a transversal chute having one end closed and the other end open, defining the lower part of the receiving opening of the cap, whereby a cover-like flange surrounding and covering the upper end of the connecting sleeve is arranged between said cylindrical part and said chute, as well as an upper part comprising said detachable cover.

In addition to the cover attachable by means of screws, the upper part of the cap also comprises a chute-like protecting flap defining the upper part of the receiving opening, and whereby one end of which being provided with an upwardly extending flange, extends into the opening at the side of said detachable cover. Preferably, a flange is provided also inside said opening behind which the flange of the protecting flap is intended to be situated when the protecting flap and the cover are installed onto the upper part of the cap. A drip moulding is preferably arranged outside the closed sides of the cover.

The receiving opening defined by the chute-like part of the cap and the protecting flap is preferably sealable by means of heat shrink rubber arranged around the pipes of a solar cell.

In the following the invention is described in more detail with reference to the accompanying drawing, wherein FIG. 1 shows an explosed view of a device according to the invention mounted on a tile roof;

FIG. 3 shows the mounted device in another position.

Figure 1:
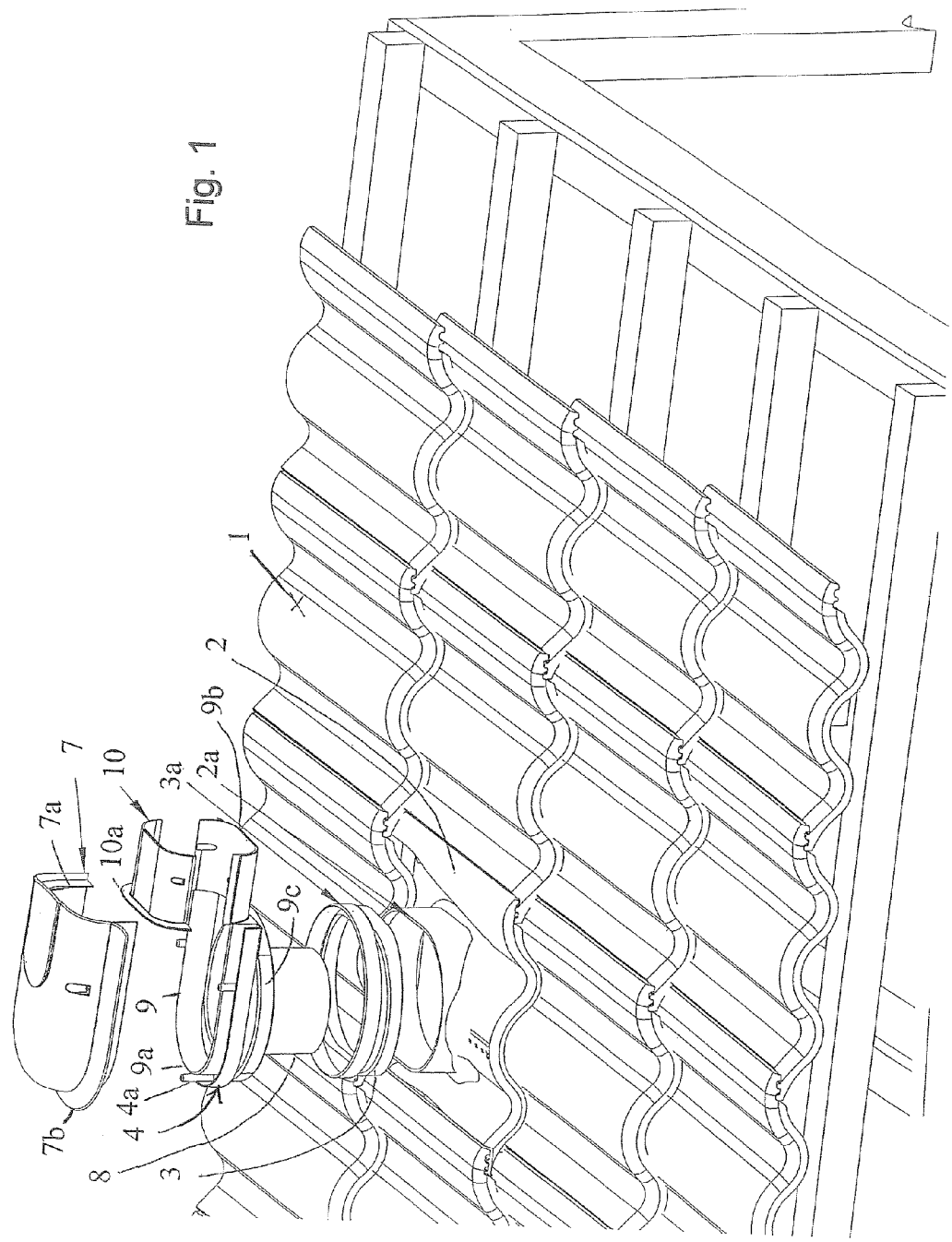

The device for leading pipes of a solar cell through a roof shown in the drawing comprises a conventional pipe duct 2 intended for a tile roof 1, the dome-like collar 2a of which have been cut straight. To the cut upper end of the collar 2a a connecting sleeve 3 surrounding the opening of the collar has been mounted, the upper end 3a of said connecting sleeve having an annular cross section. To the upper part 3a of the connecting sleeve a cap 4 has been turnably mounted, the cap being provided with a sideward-facing receiving opening 5 for pipes 6 to be led from a solar cell into the building, in which pipes a heat transfer fluid, for instance glycol, flows. The receiving opening 5 is sealable with heat shrink rubber installed around said pipes 6.

The cap 4 is provided with a dome-like detachable cover 7, which is open towards the receiving opening 5. A downwardly extending flange 7a is arranged inside the opening provided in the cover 7. The cover 7 is fastened to the lower part 4a of the cap 4 by means of three screws and can easily be detached by loosing these screws enabling thus access to an aeration screw provided for the pipes of a solar cell under the cover for aerating said pipes, if required.

The bottom end of the lower part 4a of the cap is formed to a cylindrical part 8 extending into the connecting sleeve, and the upper part of it is formed to a transversal chute 9 having one end closed and its other end open, defining the lower part of the receiving opening 5 of the cap, whereby a cover-like flange 9c surrounding and covering the upper end of the connecting sleeve 3 is arranged between said cylindrical part 8 and said chute 9.

The upper part of the cap consists of said detachable cover 7 and a chute-like protecting flap 10 defining the upper part of the receiving opening 5 and one end of which being provided with an upwardly extending flange 10a, which in installed position is intended to be situated behind a flange 7a arranged inside the opening at the side of the detachable cover 7. This protecting flap 10 remains in its place and keeps the pipes 6 in place, when the cover 7 has been removed.

Figure 2:
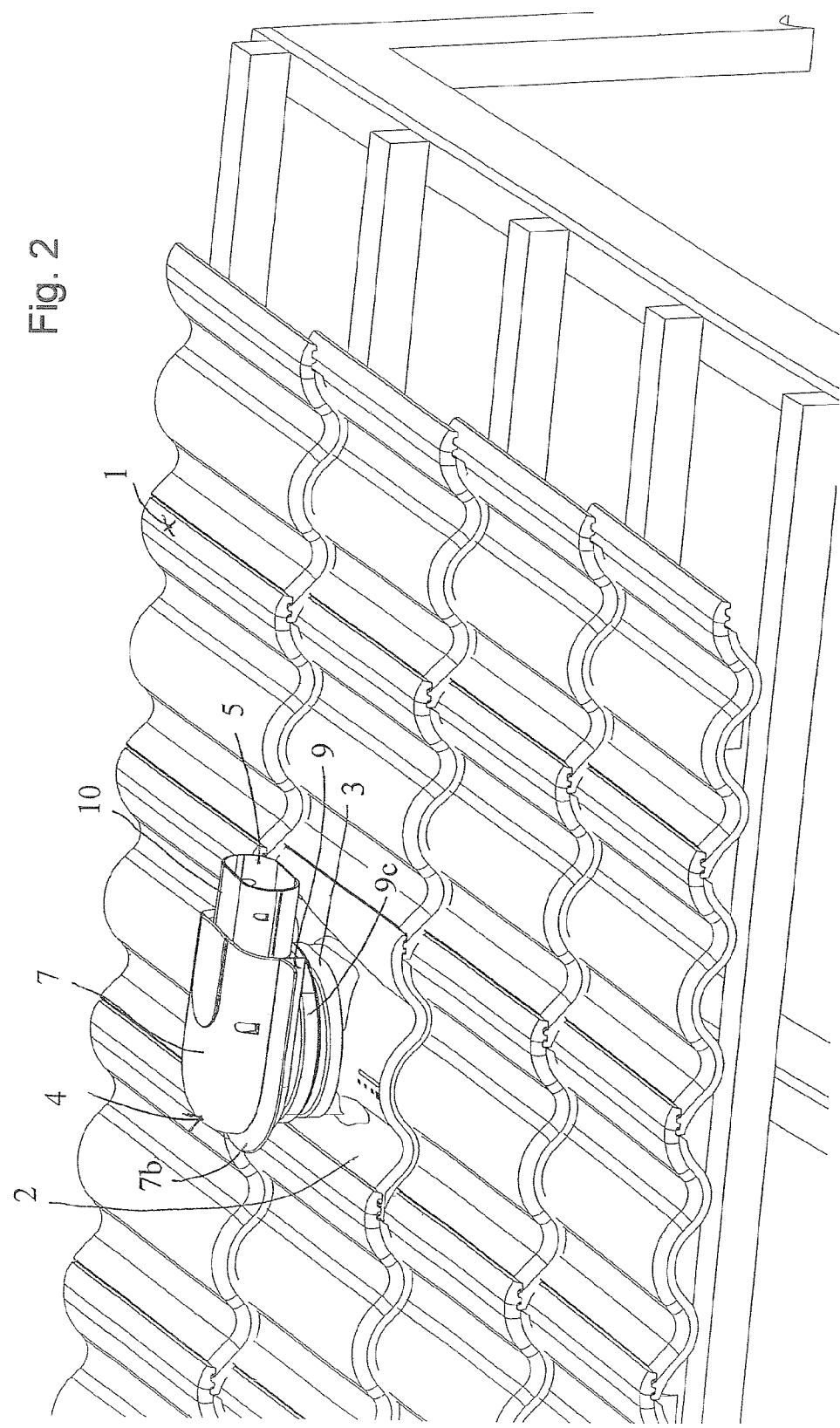
FIG. 2 shows the device mounted on a tile roof.

The cap of the device according to the invention is turnable 360° around its axis which enables to install the device in any desired position, for example in a position according to FIG. 2, where the receiving opening is directed to the right side, or in that of FIG. 3 where the receiving opening is directed downwardly. Although the embodiment shown in the drawing is intended to be installed on a tile roof, it is understood that the device according to the invention is suitable to be installed on all kind of roofs, irrespective of the roofing material used, whereby only the pipe duct of the device is to be selected in accordance with the roofing material.

The invention claimed is:

1. A device for leading pipes of a solar cell through a roof, comprising:
    a connecting sleeve having an upper end with an annular cross section, said connecting sleeve being mounted onto a straight-cut upper end of a domed collar of a conventional pipe duct to surround the opening of the collar; and
    a cap turnably installed on the upper end of said connecting sleeve and provided with a sideward-facing receiving opening for pipes to be led from a solar cell into the building, said receiving opening being sealable around said pipes;
    said cap comprising:
        a lower part, which in its lower end is formed to a cylindrical part extending into the connecting sleeve and in its upper end formed to a transversal chute, having one end closed and the other end open, defining the lower part of the receiving opening of the cap;
        a cover-like flange surrounding and covering the upper end of the connecting sleeve, arranged between the cylindrical part and the chute; and
        an upper part comprising a detachable cover.

2. The device according to claim 1, wherein the upper part of the cap further comprises a chute-like protecting flap defining the upper part of the receiving opening and one end of which being provided with an upwardly extending flange, which in installed position is intended to be situated behind a flange inside the opening at the side of the detachable cover.

3. The device according to claim 1, wherein said detachable cover is open towards the receiving opening and is provided with a downwardly extending flange inside the opening in the cover, and wherein an aeration screw is arranged under said detachable cover for aerating the pipes of a solar cell.

4. The device according to claim 1, wherein the receiving opening of the cap is sealable by means of heat shrink rubber installed around the pipes of a solar cell.

5. The device according to claim 2, wherein the receiving opening of the cap is sealable by means of heat shrink rubber installed around the pipes of a solar cell.

* * * * *